United States Patent [19]

Miyadera et al.

[11] 3,926,914

[45] Dec. 16, 1975

[54] POLYMERS PREPARED FROM AROMATIC DIAMINOALKOXYCARBOXYLAMINE COMPOUNDS AND DIANHYDRIDES AND METHOD FOR THEIR PREPARATION

[75] Inventors: Yasuo Miyadera; Hisao Yokokura, both of Hitachi, Japan

[73] Assignee: Hitachi, Ltd., Japan

[22] Filed: Nov. 6, 1973

[21] Appl. No.: 413,232

[52] U.S. Cl.... 260/47 CP; 117/126 GR; 117/128.4; 117/161 P; 161/197; 161/227; 260/30.2; 260/30.6 R; 260/32.6 N; 260/49; 260/63 N; 260/65; 260/78 TF

[51] Int. Cl.² ........................................ C08G 73/06

[58] Field of Search........ 260/78 TF, 47 CP, 49, 65, 260/63 N

[56] References Cited

UNITED STATES PATENTS

| | | | |
|---|---|---|---|
| 3,414,543 | 12/1968 | Paufler............................... | 260/47 |
| 3,671,486 | 6/1972 | Dixon et al. ......................... | 260/37 |
| 3,725,344 | 4/1973 | Miyadera et al..................... | 260/47 |

*Primary Examiner*—Lester L. Lee
*Attorney, Agent, or Firm*—Craig & Antonelli

[57] ABSTRACT

A novel copolymeric resinous material is obtained by reacting an aromatic diaminoalkoxycarbonylamino compound having amino groups and an alkoxycarbonylamino group on the aromatic nucleus with a tetracarboxylic acid derivative in an inert solvent.

43 Claims, No Drawings

POLYMERS PREPARED FROM AROMATIC DIAMINOALKOXYCARBOXYLAMINE COMPOUNDS AND DIANHYDRIDES AND METHOD FOR THEIR PREPARATION

Polyimidazopyrrolone is well known as a material with excellent heat resistance. A process for producing the same comprises allowing an aromatic tetramine to react with a tetracarboxylic acid dianhydride, or allowing an aromatic triamine to react with a tetracarboxylic acid dianhydride, in an inert polar solvent, to synthesize a polyamic acid amine, and then heating the resulting polyamic acid amine to undergo cyclodehydration. Since this process uses a tetramine or triamine, however, the process is accompanied by a disadvantage that gelation is liable to be caused during and after the reaction because the three or four amino groups in the molecule have almost equal reactivity. For this reason, the process has a greatly limited utility.

An object of the present invention is to provide a copolymeric resinous material which is chemically stable at room temperature or a temperature near thereto and hard to gel.

Another object is to provide a resinous material with excellent heat resistance and excellent mechanical, electrical and chemical properties, obtained by cyclizing the copolymeric resinous material.

A further object is to provide a resinous material with excellent flexibility.

A still further object is to provide a film with excellent heat resistance and excellent mechanical, electrical and chemical properties.

A still further object is to provide a resinous material which is useful as an electrical insulating material, a laminate, an adhesive, a paint and an impregnating agent.

A still further object is to provide a useful resinous material which is substitutable for the overcoating material or passivation film, such as $SiO_2$ film, $SiN_3$ film $TiO_2$ film, $Al_2O_3$ film, $Ti_3N_4$ film, $Ta_2O_5$ film, silicone rubber or the like in various semiconductor devices.

A still further object is to provide a resinous material which is useful as an insulating film for heat-resistant enameled wire.

Other objects and advantages will be made clear from the description given below.

According to the present invention, there is provided a polyamide type copolymeric resinous material obtained by allowing (a) an aromatic diaminoalkoxycarbonylamino compound with two amino groups and at least one alkoxycarbonylamino group on the aromatic nucleus to react with (b) a tetracarboxylic acid derivative, in an inert solvent, and also a copolymeric resinous material obtained by cyclizing said polyamide type copolymeric resinous material, and a process for producing the same.

In finding the process of the present invention, the present inventors attempted to allow the model compounds represented by the formulas given below to react and confirmed that as a result of reaction, an amido intermediate is first formed and an imidazopyrrolone ring is then formed by cyclizing said product.

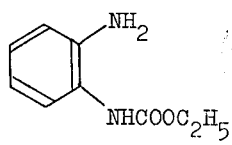 + 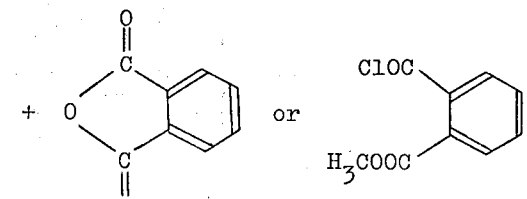

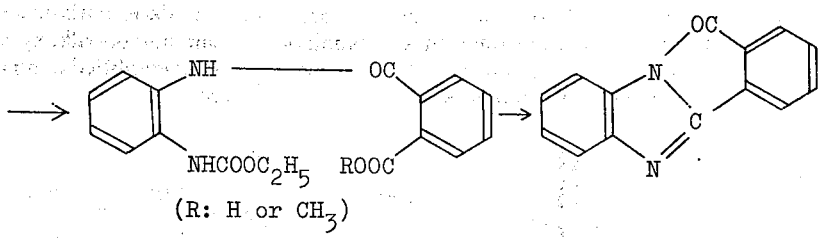

(R: H or $CH_3$)

And by applying the above reaction to polyfunctional compounds, the present inventors have succeeded in making the present invention.

An Example of Synthesis of a Model Compound (2-Amino-phenyl)urethane (0.9 g) was dissolved in acetone. The urethane solution was then admixed with 0.74 g of phthalic anhydride and the mixture was subjected to reaction at room temperature for an hour. After completion of the reaction, the resulting (2-o-carboxybenzoylamino-phenyl)urethane was heated at 250°C for 3 hours to convert it to 11-H-isoindro(2,1a)-benzimidazol-11-one, which had a melting point of 210° to 211°C. It was confirmed that, as stated above, an imidazopyrrolone ring is formed from the amic acid urethane linkage according to the above model reactions.

The reaction in the present invention is represented by the general formulas given below. However, the reaction formulas given below are typical and basic reaction formulas in the present invention, but the copolymeric resinous material actually produced is more complicated than that represented by the formulas given.

1. In the case of using an aromatic diaminomonoalkoxycarbonylamino compound having one alkoxycarbonylamino group as the aromatic diaminoalkoxycarbonylamino compound:

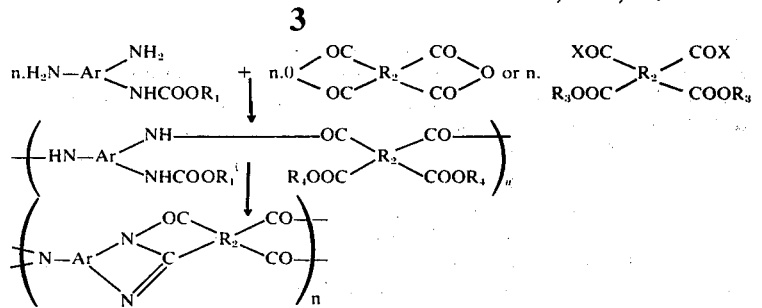

(A)

(B)

2. In the case of using an aromatic diaminodialkoxycarbonylamino compound having two alkoxycarbonylamino groups as the aromatic diaminoalkoxycarbonylamino compound:

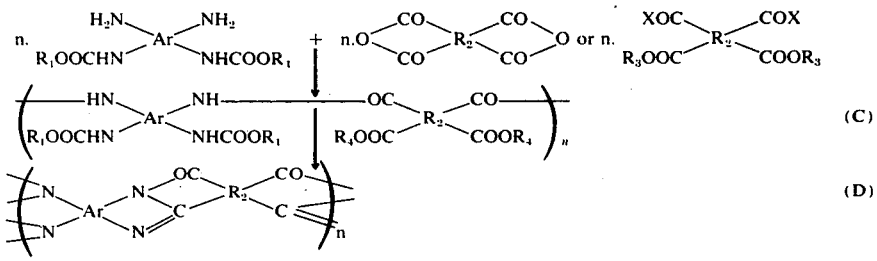

(C)

(D)

3. In the case of using both the abovementioned aromatic diaminomonoalkoxycarbonylamino compound and the above-mentioned aromatic diaminodialkoxycarbonylamino compound as the aromatic diaminoalkoxycarbonylamino compound:

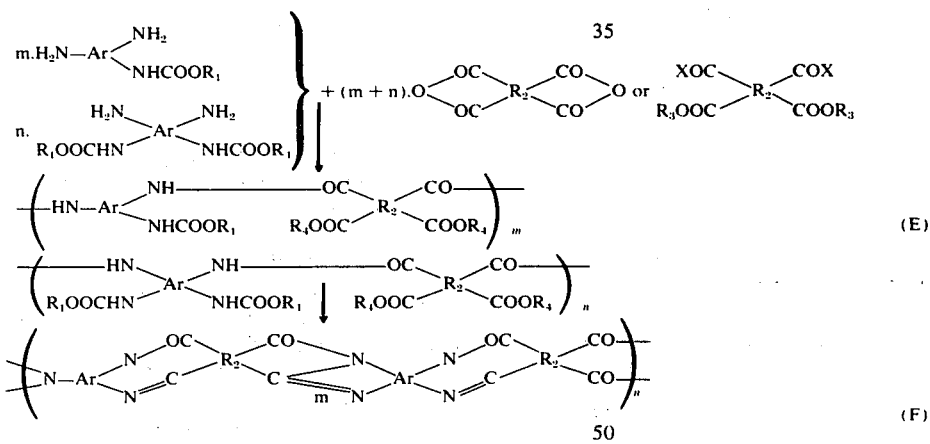

(E)

(F)

In the above reaction formulas, Ar is an aromatic diaminoalkoxycarbonylamino compound residue; $R_1$ and $R_3$ are monovalent groups such as alkyl groups with 4 or less carbon atoms, aryl groups with 6 to 12 carbon atoms, cycloalkyl groups with 6 to 12 carbon atoms, aralkyl groups with 7 to 12 carbon atoms and alkaryl groups with 7 to 12 carbon atoms; $R_2$ is a tetracarboxylic acid derivative residue, $R_4$ is hydrogen or the above defined $R_3$; X is a halogen atom; and $m$ and $n$ are positive numbers. The resinous materials which are the reaction products of aforesaid formulas (A) to (F) are random type polymers.

The aromatic diaminoalkoxycarbonylamino compound used in the present invention is at least one compound selected from the group consisting of aromatic diaminomonoalkoxycarbonylamino compounds with one alkoxycarbonylamino group ($-NHCOOR_1$) as observed in the above cases (1) and (3), and aromatic diaminodialkoxycarbonylamino compounds with two alkoxycarbonylamino groups. As the aromatic diaminomonoalkoxycarbonylamino compounds, there are exemplified compounds represented by the formulas:

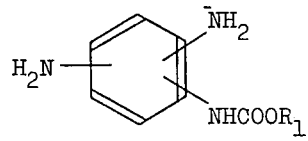

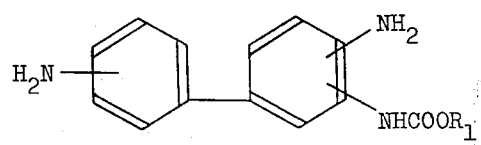

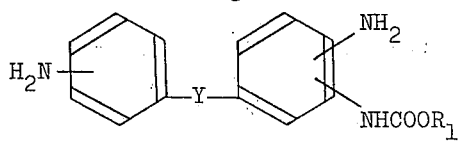

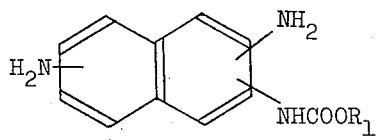

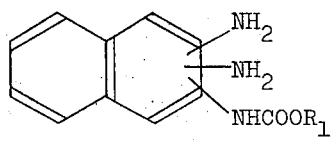

wherein R₁ is the same as defined above, and Y is O, S, CH₂, SO₂ or CO; and one amino group and the alkoxycarbonylamino group bonded to the aromatic nucleus may be present in any position of the aromatic nucleus as long as they are attached to adjacent carbon atoms; and the hydrogen atoms of the aromatic nuclei may be replaced by other inert groups such as, for example, alkyl groups, cycloalkyl groups, aryl groups and halogen atoms. Concretely there may be used at least one of 2,4-diaminophenylurethane, 2,4-diamino-6-methylphenylurethane, 2,6-diamino-3-methylphenylurethane, 2,4-diamino-3-methylphenylurethane, 2,4-diamino-5-methylphenylurethane, 2,6-diamino-4-methylphenylurethane, 2,4-diamino-1-naphthylurethane, 1,6-diamino-2-naphthylurethane, 4,4'-diamino-3-ethoxycarbonylaminodiphenyl ether, 5-(m-aminophenoxy)-2-aminophenylurethane and 4-(p-aminophenyl)-2-aminophenylurethane. Further, as the aromatic diaminodialkoxycarbonylamino compounds, there are exemplified compounds represented by, for example, the formulas:

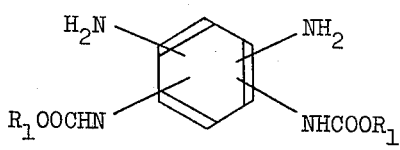

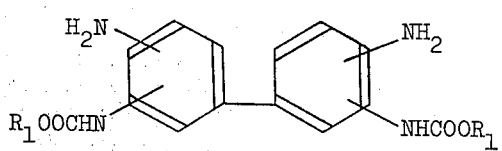

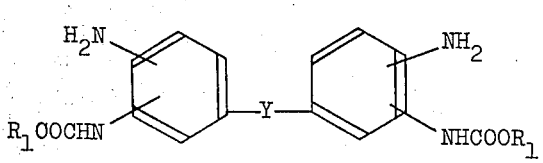

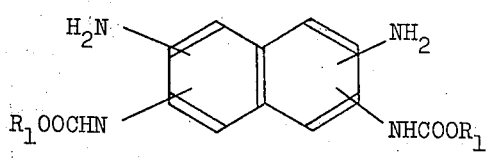

wherein R₁ is the same as defined above, and Y is O, S, CH₂, SO₂ or CO; and one amino group and one alkoxycarbonylamino group bonded to one aromatic nucleus may be present in any position of the aromatic nucleus as long as they are attached to adjacent carbon atoms; and the hydrogen atoms of the aromatic nuclei may be replaced by other inert groups, such as, for example, alkyl groups, cycloalkyl groups, aryl groups and halogen. Concretely there may be used at least one of 3,3'-diamino-4,4'-diethoxycarbonylaminodiphenyl ether, 3,3'-diamino-4,4'-diethoxycarbonylaminodiphenylmethane, 3,3'-diamino-4,4'-diethoxycarbonylaminodiphenyl, 3,3'-diamino-4,4'-diethoxycarbonylaminophenylsulfone, 3,3'-diamino-4,4'-diethoxycarbonylaminodiphenylsulfide, 1,5-diamino-2,4-diethoxycarbonylaminobenzene, and 1,4-diamino-2,5-diethoxycarbonylaminobenzene.

As the tetracarboxylic acid derivatives to be reacted with the aromatic diaminoalkoxycarbonylamino compound, there may be used not only tetracarboxylic acid dianhydrides represented by the formula:

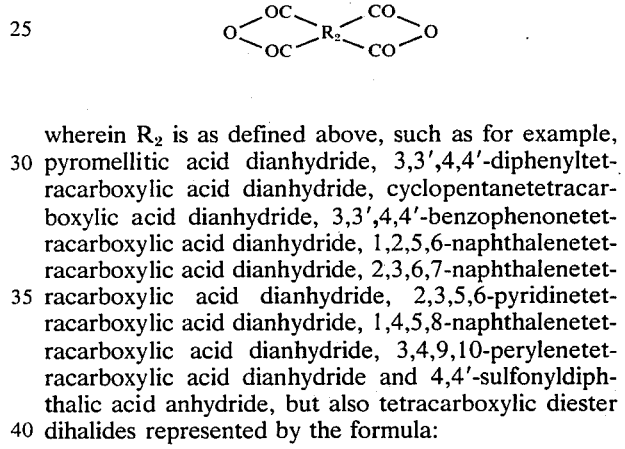

wherein R₂ is as defined above, such as for example, pyromellitic acid dianhydride, 3,3',4,4'-diphenyltetracarboxylic acid dianhydride, cyclopentanetetracarboxylic acid dianhydride, 3,3',4,4'-benzophenonetetracarboxylic acid dianhydride, 1,2,5,6-naphthalenetetracarboxylic acid dianhydride, 2,3,6,7-naphthalenetetracarboxylic acid dianhydride, 2,3,5,6-pyridinetetracarboxylic acid dianhydride, 1,4,5,8-naphthalenetetracarboxylic acid dianhydride, 3,4,9,10-perylenetetracarboxylic acid dianhydride and 4,4'-sulfonyldiphthalic acid anhydride, but also tetracarboxylic diester dihalides represented by the formula:

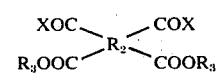

wherein R₂, R₃ and X are the same as defined above. Said tetracarboxylic diester dihalide can be obtained by allowing an alcohol to act on said tetracarboxylic acid dianhydride to form a tetracarboxylic diester and further allowing a thionyl halide to act on the tetracarboxylic diester. At least one of the respective tetracarboxylic acid dianhydrides and tetracarboxylic diester dihalides mentioned above may be used.

In the reaction between (a) said aromatic diaminoalkoxycarbonylamino compound and (b) said tetracarboxylic acid derivative in the present invention, it is possible to copolymerize them with (c) a diamine compound at the third component. By copolymerizing the diamine compound, flexibility can be imparted to the objective resinous material. The copolymerization reaction of the diamine compoound is shown by the formulas given below. These reaction formulas are the typical and basic reaction formulas in the present invention as stated previously.

4. In the case of using an aromatic diaminomonoalkoxycarbonylamino compound as the aromatic diaminoalkoxycarbonylamino compound:

5. In the case of using an aromatic diaminodialkoxycarbonylamino compound as the aromatic diaminoalkoxycarbonylamino compound:

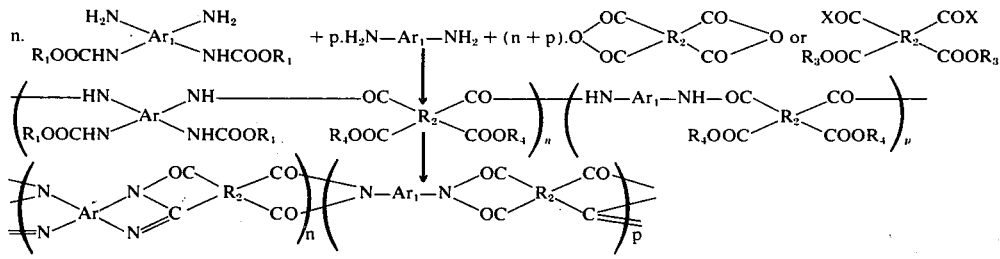

6. In the case of using an aromatic diaminomonoalkoxycarbonylamino compound and an aromatic diaminodialkoxycarbonylamino compound in combination as the aromatic diaminoalkoxycarbonylamino compound:

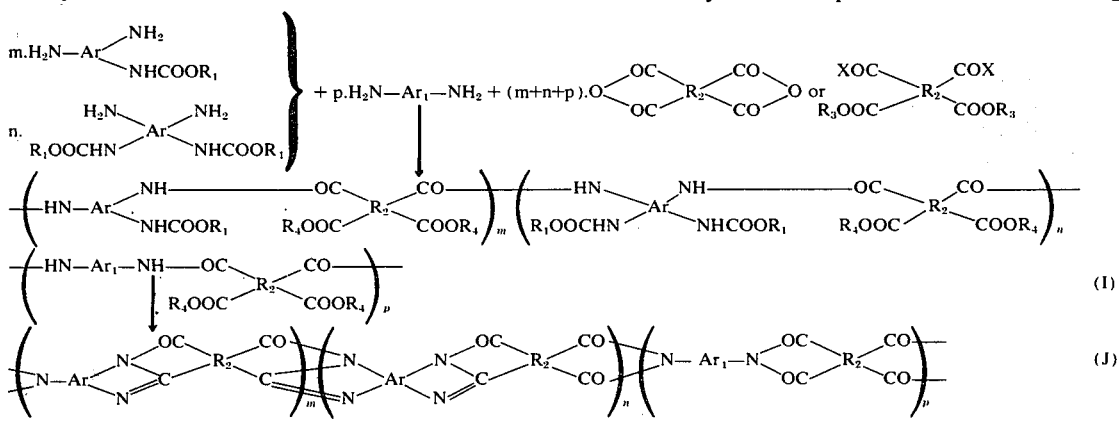

In the aforesaid reaction formulas, Ar, $R_1$, $R_2$, $R_3$, $R_4$ and X are the same as defined previously, and $Ar_1$ is a diamine compound residue, and m, n and p represent positive numbers. The resinous material produced represented by the aforesaid formulas (G) to (J) are random type co-polycondensation products.

As the diamine compound used in the present invention, there may be used, for example, at least one of 4,4'-diaminodiphenyl ether, 4,4'-diaminodiphenylmethane, 4,4'-diaminodiphenylpropane, 4,4'-diaminodiphenylsulfone, 4,4'-diaminodiphenylsulfide, 3,3'-diaminodiphenylsulfone, benzidine, methaphenylenediamine, paraphenylenediamine, 1,5-diaminonaphthalene, 2,6-diaminonaphthalene, 4,4'-di(m-aminophenoxy)-diphenylsulfone, 2,6-diaminopyridine, 4,4'-di(p-aminobenzoyl)diphenyl ether, 4,4'-di(p-aminophenoxy)diphenylsulfone, 1,4-di(p-aminophenoxy)-benzene and 1,3-di(p-aminophenoxy)benzene.

The mixing ratio of the above mentioned diamine compound to the aforesaid aromatic diaminoalkoxycarbonylamino compound can be varied in a considerably wide range. In an ordinary case, the mixing ratio can be selected from the range of 5 to 95 mole percent of diamine compound per 95 to 5 mole percent of aromatic diaminealkoxycarbonylamino compound.

In the present invention, a reaction between the aforesaid aromatic diaminoalkoxycarbonylamino compound and tetracarboxylic acid derivative is caused basically at an equimolar ratio. Accordingly, the amounts of these compounds charged actually into a reactor are set at an equimolar ratio. However, when moisture is present in a reaction solvent, the tetracarboxylic acid derivative is consumed by said moisture. Hence, if necessary, it is desirable to take the consumption amount into consideration and to use the tetracarboxylic acid derivative in an excess corresponding to the consumption amount. In an ordinary case, the amount of moisture contained in the reaction solvent is extremely small, and therefore, it is sufficient that the amount of tetracarboxylic acid derivative to be charged into the reactor is about 1.01 to 1.03 moles per mole of the aromatic diaminoalkoxycarbonylamino compound. Of course, if substantially no moisture is contained, said derivative and said compound are charged into the reactor at an equimolar ratio. Further, even when a diamine compound is used, the mixing ratio of said compound to the tetracarboxylic acid derivative is set basically at an equimolar ratio as stated previously. When moisture is present in a solvent, the influence of moisture must be taken into account for quite the same reason as stated previously.

In practicing the present invention, an inert solvent is used. The solvent to be used may have no ability to dissolve all of the starting material components (a) to (c). Particularly useful solvent are those having an ability to dissolve not only the starting material components but also the produced polyamide type copolymeric resinous materials. As the inert solvent to be used for the present invention, there may be mentioned, for example, N-methyl-2-pyrrolidone, N,N-dimethylacetamide, N,N-dimethylformamide, N,N-diethylformamide, hexamethylphosphoramide, pyridine, triethylamine, N,N-dimethylaniline, quinoline, isoquinoline and N-ethylmorpholine. These may be used alone or as a mixed solvent consisting of at least two thereof. A mixed solvent obtained by admixing a secondary amine, or a tertiary amine or aminoalcohol or ammonium carboxylate with a phenolic solvent such as phenol, cresol and xylenol, may be used, too. Further, a mixed solvent obtained by mixing diacetone alcohol or cellosolve or the like with an amine solvent and/or an amide solvent, may also be used.

When a tetracarboxylic diester dihalide is used as the tetracarboxylic acid derivative which is the (b) component, and cresol, xylenol or the like is used as the solvent, hydrogen halide is generated. In this case, the hydrogen halide can be caught by an epoxy compound added to the reaction system in advance, if necessary. Further, the solubility of the formed polyamide type copolymeric resinous material can be enhanced by adding a small amount of lithium chloride and magnesium chloride to the solvent.

The reaction for producing the polyamide type compound in the present invention takes place at a relatively low temperature. It is usually effected at a temperature of 100°C or lower, preferably 60°C or lower. Further the reaction for cyclizing the polyamide type compound into imidazopyrrolone ring is effected by heating to a temperature of 100°C or higher, preferably 250° – 400°C.

In practicing the present invention, the method of charging each of the aforesaid starting materials has no limit. Several methods are given below:

I. A method of adding the tetracarboxylic acid derivative to an inert solvent containing dissolved therein diaminoalkoxycarbonylamino compound.

II. A method of simultaneously admixing the diaminoalkoxycarbonylamino compound, an inert solvent and the tetracarboxylic acid derivative.

III. A method of adding a solution of the tetracarboxylic acid derivative in a solvent to a solution of the diaminoalkoxycarbonylamino compound in a solvent.

IV. A method of adding a solution of the tetracarboxylic acid derivative in a solvent to a solution of the diaminoalkoxycarbonylamino compound and the diamine in a solvent.

V. A method of simultaneously admixing the diaminoalkoxycarbonyl amino compound, the diamine, the tetracarboxylic acid derivative and a solvent.

VI. A method of adding the diaminoalkoxycarbonylamino compound and the diamine to a solution of the tetracarboxylic acid derivative in a solvent.

In the present invention, the ring-closure reaction for conversion of the polyamide type copolymeric resinous compound to a resinous material with imidazopyrrolone rings can be carried out at any time without resrictions. For example, the reaction can be carried out either before or after applying the aforesaid resinous material to an article to which said material is to be applied.

The present polyimidazopyrrolone is excellent in heat-resistance, abrasion-resistance, and chemical-resistance and useful in insulating materials, laminates, adhesives, paints, films and insulating films for semi-conductors.

When used in insulated wires, prints and insulating films for semi-conductor, the polyamide type intermediate solution is applied and then heated to convert it into polyimidazopyrrolone. When used in laminates and adhesives, the polyamide type intermediate solution is applied to glass cloths or substrates, the solvent is removed, the glass cloths or substrates are put one on another, and the resulting assembly is heated under pressure to undergo ring-closure.

Films can be prepared by casting or stretching by means of a molding machine.

EXAMPLE 1

In a 100-cc, four necked flask with a thermometer, a stirrer and a calcium chloride tube were placed 7.48 g of 3,3'-diamino-4,4'-diethoxycarbonylaminodiphenyl ether and 60 cc of N-methyl-2-pyrrolidone, and the mixture in the flask was well stirred. The flask was then cooled in an ice bath. To the contents in the flask was slowly added 6.44 g of 3,3',4,4'-benzophenonetetracarboxylic acid dianhydride. After the addition was completed, the mixture was subjected to reaction for 7 hours. A part of the resinous intermediate consisting of the resulting polyamic acid urethane was poured into water to form precipitates. After the resulting precipitates were filtered, they were dried up at room temperature under reduced pressure. The measurement was made of the reduced viscosity, $\eta_{sp/c}$, of the precipitates to find that they had a reduced viscosity of 1.33 dl/g (Solvent: dimethylsulfoxide; concentration: 0.1 g/100 cc. of solution; temperature: 30°C.; the same applies to other Examples. Further, this polyamic acid urethane solution was stable without gelling even after six months at room temperature. Subsequently, said polyamic acid urethane solution was poured on a pane, and dried, and the solvent was then removed at 80°C to obtain a tough film. Said film was further subjected to heat treatment at a temperature of 300°C to 400°C to ring-close the same to convert into a film of resinous material consisting of the objective polyimidazopyrrolone. The weight of the resulting film did not decrease below 470°C when the film was heated in air. On the other hand, a surface of semi-conductor element was coated with a polyamide acid urethane solution as an undercoating material. After coating, the semi-conductor was heated at 250°C for an hour. Said semi-conductor stood the pressure water immersion test at 120°C at 2 atms.

EXAMPLE 2

In the same flask as in Example 1 were placed 7.48 g. of 3,3'-diamino-4,4'-diethoxycarbonylaminophenylether, 30 cc of N,N-dimethylacetamide and 30 cc of N-methyl-2-pyrrolidone, and the contents in the flask were well stirred and the flask was then cooled in an ice bath. To the contents in the flask was slowly added 4.36 g of pyromellitic acid dianhydride. After the completion of addition, the mixture was subjected to reaction for 7 hours. A resinous intermediate product consisting of polyamic acid urethane was obtained and its reduced viscosity was 1.50 dl/g. Said polyamic acid urethane solution was stable at room temperature without gelling even after one year. The resulting solution was poured on a pane and dried up to obtain a tough film. The resulting film was heated at a temperature of 300° to 400°C to ring-close and convert the same into a polyimidazopyrrolone film. The weight of the film did not decrease below 470°C when the film was heated in air.

EXAMPLE 3

In the same flask as in Example 1 were placed 7.44 g of 3,3'-diamino-4,4'-diethoxycarbonylaminodiphenylmethane and 60 cc of N,N-dimethylacetamide and the contents in the flask were well stirred. To the contents in the flask was slowly added 6.44 g of 3,3',-4,4'-benzophenonetetracarboxylic acid dianhydride. After the addition was completed, the mixture was subjected to reaction for 5 hours. A resinous intermediate composed of polyamic acid urethane was obtained and its $\eta_{sp/c}$ was 1.03 dl/g. The polyamic acid urethane solution did not gel at room temperature even after 6 months. From this solution, there was obtained a tough film. The resulting film was subjected to heat treatment at a temperature of 200° to 350°C to effect intermolecular cyclization, thereby converting it into the objective polyimidazopyrrolone film. The weight of the film did not decrease below 450°C when the film was heated in air.

EXAMPLE 4

In the same four-necked flask as in Example 1 were placed 7.48 g of 3,3'-diamino-4,4'-diethoxycarbonylaminodiphenyl ether and 60 cc of N-methyl-2-pyrrolidone. The flask was cooled in an ice bath. The contents in the flask were well stirred. To the contents in the flask were slowly added 6.38 g of 2,5-dicarbomethoxyterephthalic acid chloride, and the temperature was kept at 10°C or lower. After the addition was completed, the mixture was subjected to reaction for 3 hours. The formed polyamide ester urethane had a reduced viscosity, $\eta_{sp/c}$ of 1.53 dl/g. Further, said solution was stable at room temperature even after 6 months. Subsequently, the precipitates of said polyamide ester urethane were again dissolved in N,N-dimethylacetamide. The thus obtained solution was poured on a pane and heated at 80°C to obtain a tough film. Said film was further subjected to heat treatment at a temperature of 300° to 350°C to ring-close and convert the same into a polyimidazopyrrolone film. The weight of the film did not decrease below 460°C when the film was heated in air.

EXAMPLE 5

In the same flask as in Example 1 were placed 7.48 g of 3,3'-diamino-4,4'-diethoxycarbonylaminodiphenyl ether, 30 cc of N,N-dimethylformamide and 30 cc of N-methyl-2-pyrrolidone. The flask was then cooled in an ice bath and the contents in the flask were well stirred. To the contents in the flask was slowly added 6.38 g of 4,6-dicarbomethoxyisophthalic acid chloride, and the temperature was kept at 10°C or lower. At this temperature, the mixture was subjected to reaction for two hours. The formed polyamide ester urethane solution had a reduced viscosity, $\eta_{sp/c}$, of 1.21 dl/g. Further, said solution was stable at room temperature without gelling even after six months. Subsequently, a polyamide ester urethane film was prepared. The obtained film was heated at a temperature of 300° to 350°C to ring-close and convert the same into a polyimidazopyrrolone film. The weight of the film did not decrease below 450°C when the film was heated in air.

EXAMPLE 6

In the same flask as in Example 1 were placed 7.44 g of 3,3'-diamino-4,4'-diethoxycarbonylaminodiphenylmethane, 30 cc of N-methyl-2-pyrrolidone. The flask was then cooled in an ice bath and the contents in the flask were well stirred. To the contents in the flask were slowly added 6.38 g of 2,5-dicarbomethoxyterephthalic acid chloride, leeping the temperature at 10°C or lower. After the addition was completed, the mixture was subjected to reaction for four hours. The formed polyamide ester urethane had a reduced viscosity, $\eta_{sp}/C$, of 1.16 dl/g. Further, said varnish did not gel at room temperature even after 6 months. Subsequently, a polyamide ester urethane film was prepared. The obtained film was heated at a temperature of 250° to 350°C to ring-close the same, thereby obtaining a polyimidazopyrrolone film. The weight of the film did not decrease below 420°C when the film was heated in air.

EXAMPLE 7

In the same four-necked flask as in Example 1 were placed 3.9 g of 2,4-diaminophenylurethane and 60 cc of N,N-dimethylacetamide. The flask was then cooled in an ice bath and the contents in the flask were well stirred. With stirring, 4.36 g of pyromellitic acid dianhydride was slowly added to the contents in the flask. The mixture was subjected to reaction at 10°C for five hours. The formed polyamic acid urethane solution had a reduced viscosity, $\eta_{sp/c}$, of 1.26 dl/g. Said solution was stable at room temperature even after 6 months. Subsequently, a polyamic acid urethane film was prepared. The obtained film was heated at a temperature of 250° to 350°C to ring-close and convert the same into a polyimido-imidazopyrrolone film. The weight of the film did not decrease below 450°C when the film was heated in air.

EXAMPLE 8

In the same flask as in Example 1 were placed 3.9 g of 2,4-diaminophenylurethane and 50 cc of N-methylpyrrolidone. The flask was then cooled in an ince bath and the contents in the flask were stirred. With stirring, 6.44 g of 3,3',4,4'-benzophenonetetracarboxylic acid dianhydride were slowly added to the contents in the flask. The mixture was subjected to reaction at 10°C for five hours. The formed polyamic acid urethane solution had a reduced viscosity, $\eta_{sp/C}$ of 1.32 dl/g. Further, said solution was stable at room temperature without gelling even after one year.

Subsequently, a polyamic acid urethane film was prepared. The obtained film was heated at a temperature of 300° to 350°C to ring-close and convert the same into a polyimido-imidazopyrrolone film. The weight of the film did not decrease below 400°C when the film was heated in air.

EXAMPLE 9

In the same flask as in Example 1 were placed 4.18 g of 2,4-diamino-6-methyl-phenylurethane and 60 cc of N,N-dimethylformamide. The flask was then cooled in an ice bath and the contents in the flask were stirred. With stirring, 6.44 g of 3,3',4,4'-benzophenonetetracarboxylic acid dianhydride were slowly added to the contents in the flask. The mixture was subjected to reaction at 10°C for 6 hours. The formed polyamic acid urethane had a reduced viscosity, $\eta_{sp/C}$, of 0.96 dl/g. Futher, said solution was stable at room temperature even after 6 months. Subsequently, a polyamic acid urethane film was prepared, and the film was heated at a temperature of 300° to 350°C to ring-close and convert the same into a polyimido-imidazopyrrolone film.

The weight of the film did not decrease below 420°C when the film was heated in air.

EXAMPLE 10

In the same four-necked flask as in Example 1 were placed 3.9 g of 2,4-diaminophenylurethane, 40 cc of N,N-dimethylacetamide and 20 cc of N-methyl-2-pyrrolidone. The flask was then cooled in an ice bath and the contents in the flask were stirred. With stirring, 6.38 g of 2,5-dicarbomethoxyterephthalic acid chloride was slowly added to the contents in the flask, and the mixture was subjected to reaction at 10°c for three hours. The formed polyamide ester urethane had a reduced viscosity, $\eta_{sp/c}$, of 1.39 dl/g.

The precipitates of polyamide ester urethane were again dissolved in N,N-dimethylacetamide, and the resulting solution was poured on a pane and heated to 80°C to obtain a tough film. Further, said film was subjected to heat treatment at 250° to 400°C under reduced pressure to ring-close and convert the same into a polyimido-imidazopyrrolone film. The weight of the film did not decrease below 450°C when the film was heated in air.

EXAMPLE 11

In the same flask as in Example 1 were placed 3.9 g of 2,4-diaminophenyl urethane and 60 cc of N-methyl-2-pyrrolidone. The flask was then cooled by ice and the contents in the flask were well stirred. With stirring, 6.38 g of 4,6-dicarbomethoxyisophthalic acid chloride was slowly added to the contents in the flask, and the mixture was subjected to reaction at 10°C for 2 hours. The formed polyamide ester urethane solution had a reduced viscosity, $\eta_{sp/c}$, of 1.25 dl/g. Further, said solution was stable at room temperature without gelling even after six months. Subsequently, a polyamide ester urethane film was prepared, and heated at a temperature of 250° to 400°C to ring-close and convert the same into a polyimido-imidazopyrrolone film. The weight of the film did not decrease below 430°C when the film was heated in air.

EXAMPLE 12

In the same flask as in Example 1 were placed 4.18 g of 2,4-diamino-6-methylphenylurethane, 20 cc of N-methyl-2-pyrrolidone and 40 cc of N,N-dimethylformamide. The flask was cooled by ice and the contents in the flask were well stirred. With stirring, 6.38 g of 2,5-dicarbomethoxyterephthalic acid chloride was slowly added to the contents in the flask. After the addition was completed, the mixture was subjected to reaction at 10°C for three hours. The formed polyamide ester urethane solution had a reduced viscosity, $\eta_{sp/c}$, of 1.18 dl/g. Further, said solution was stable at room temperature without gelling even after 3 months. Subsequently, a polyamide ester urethane film was prepared and heated at a temperature of 250° to 350°C to ring-close and convert the same into a polyimido-imidazopyrrolone film. The weight of the film did not decrease below 400°C when the film was heated in air.

EXAMPLE 13

In the same four-necked flask as in Example 1 were placed 3.74 g of 3,3'-diamino-4,4'-diethoxycarbonylaminodiphenyl ether, 2.00 g of 4,4'-diaminodiphenyl ether, 30 cc of N-methyl-2-pyrrolidone and 30 cc of N,N-dimethylacetamide, and the flask was cooled in an ice bath. The contents in the flask were well stirred and dissolved. Pyromellitic acid dianhydride (4.36 g) was slowly added to the contents in the flask, and the mixture was subjected to reaction at 10°C for six hours. After the completion of reaction, the formed polyamic acid urethane solution had a reduced viscosity, $\eta_{sp/c}$, of 1.25 dl/g. Further, said solution was stable at room temperature without gelling even after one year. Subsequently, the polyamic acid urethane solution was poured on a pane and heated to obtain a tough film. The resulting film was further subjected to heat treatment at a temperature of 250° to 400°C under reduced pressure to ring-close and convert the same into a polyimidoimidazopyrrolone film. The weight of the film did not decrease below 460°C when the film was heated in air.

EXAMPLE 14

In the same flask as in Example 1 were placed 3.74 g of 3,3'-diamino-4,4'-diethoxycarbonylaminodiphenyl ether, 4.32 g of 4,4'di(m-aminophenoxy)diphenylsulfone, 30 cc of N-methyl-2-pyrrolidone and 30 cc of N,N-dimethylacetamide, and the flask was cooled in an ice bath. The contents in the flask were well stirred. To the contents in the flask were slowly added 2.18 g of pyromellitic acid dianhydride and 3.22 g of 3,3',4,4'-benzophenonetetracarboxylic acid dianhydride. After the addition was completed, the mixture was subjected to reaction at 10°C for six hours. The formed polyamic acid urethane had a reduced viscosity of 0.98 dl/g. Further, said solution was stable at room temperature without gelling even after two years. Next, a film was made from the polyamic acid urethane solution, and heated at a temperature of 250° to 400°C to ring-close and convert the same into a polyimido-imidazopyrrolone film. The weight of the film did not decrease below 450°C when the film was heated in air. On the other hand, the surface of a semiconductor having pnp junction parts was coated with said polyamic acid urethane and cured at 300°C for an hour. When a DC of 2 KV was applied between a collector and a base, the leakage current was $10^{-8}$A or lower.

EXAMPLE 15

In the same flask as in Example 1 were placed 3.72 g of 3,3'-diamino-4,4'-diethoxycarbonylaminodiphenylmethane, 2.48 g of 3,3'-diaminodiphenylsulfone, 20 cc of N-methyl-2-pyrrolidone and 40 cc of N,N-dimethylacetamide. The flask was then cooled by ice and the contents in the flask were well stirred. To the contents in the flask was slowly added 6.44 g of 3,3',4,4'-benzophenonetetracarboxylic acid dianhydride, and the mixture was subjected to reaction at 10°C for five hours. The formed polyamide acid urethane had a reduced viscosity, $\eta_{sp/c}$, of 1.32 dl/g. Said solution weas stable at room temperature without gelling even after one year. Subsequently, a film was made from said polyamide acid urethane solution, and heated at a temperature of 250° to 400°C to ring-close and convert it into a polyimido-imidazopyrrolone film. The weight of the resulting film did not decrease below 430°C when the film was heated in air.

EXAMPLE 16

In the same flask as in Example 1 were placed 3.74 g of 3,3'-diamino-4,4'-diethoxycarbonylaminodiphenylether, 1.98 g of 4,4'-diaminodiphenylmethane, and 60 cc of N,N-dimethylacetamide, and the flask was then cooled by ice and the contents in the flask were well stirred. To the contents in the flask was slowly added 6.44 g of 3,3′,4,4′-benzophenonetetracarboxylic acid dianhydride, and the mixture was subjected to reaction at 10°C for six hours. The formed polyamic acid urethane had a reduced viscosity, $\eta_{sp/c}$, of 0.86 dl/g. Said solution was stable at room temperature even after one year. Subsequently, a film was made from the polyamic acid urethane solution, and heated at a temperature of 250° to 400°C to ring-close the same. The weight of the resulting film did not decrease below 400°C when the film was heated in air.

EXAMPLE 17

In the same four-necked flask as in Example 1 were placed 3.74 g of 3,3′-diamino-4,4′-diethoxycarbonylaminodiphenyl ether, 4.32 g of 4,4′-di(m-aminophenoxy)-diphenylsulfone, 30 cc of N-methyl-2-pyrrolidone and 30 cc of N,N-dimethylacetamide. The contents in the flask were stirred well and dissolved. The flask was then cooled in an ice bath. To the contents in the flask was slowly added 6.38 g of 2,5-dicarbomethoxyterephthalic acid chloride at a temperature of 10° or lower. After the addition was completed, the mixture was subjected to reaction for three hours. The formed polyamide ester urethane had a reduced viscosity, $\eta_{sp/c}$, of 0.94 dl/g. Said solution was stable at room temperature even after three months. Subsequently, a film was made from the polyamide ester urethane and the resulting film was heated at a temperature of 250° to 400°C under reduced pressure to ring-close and convert the same into a polyimidoimidazopyrrolone film. The weight of the resulting film did not decrease beflow 450°C when the film was heated in air.

EXAMPLE 18

In the same flask as in Example 1 were placed 3.74 g of 3,3′-diamino-4,4′-diethoxycarbonylaminodiphenyl ether, 2.00 g of 4,4′-diaminodiphenyl ether, 20 cc of N-methyl-2-pyrrolidone and 40 cc of N,N-dimethylacetamide. The contents in the flask were well stirred, and the flask was cooled by ice. To the contents in the flask was slowly added 6.38 g of 4,6-dicarbomethoxyisophthalic acid chloride. After the addition was completed, the mixture was subjected to reaction for 2 hours. The formed polyamide ester urethane had a reduced viscosity, $\eta_{sp/c}$, of 1.27 dl/g. Said solution was stable at room temperature even after three months. Then a film made from said polyamide esther urethane was heated at a temperature of 250° to 400°C to ring-close and convert the same into a polyimido-imidazopyrrolone film. The weight of the resulting film did not decrease below 460°C when the film was heated in air.

EXAMPLE 19

In the same flask as in Example 1 were placed 3.72 g of 3,3′-diamino-4,4′-diethoxycarbonylaminodiphenylmethane, 2.48 g of 3,3′-diaminodiphenylsulfone, 40 cc of N-methyl-2-pyrrolidone and 20 cc of N,N-dimethylformamide. The contents in the flask were stirred and the flask was cooled by ice. To the contents in the flask were slowly added 6.38 g of 2,5-dicarbomethoxyterephthalic acid chloride, and the mixture was subjected to reaction for 2 hours. The formed polyamide ester urethane had a reduced viscosity, $\eta_{sp/c}$, of 1.05 dl/g. Said solution was stable at room temperature even after 6 months. Then a film was made from the polyamide ester urethane, and heated at a temperature of 250° to 400°C to ring-close and convert the same into polyimido-imidazopyrrolone film. The weight of the resulting film did not decrease below 450°C when the film was heated in air.

EXAMPLE 20

In the same four-necked flask as in Example 1 were placed 1.95 g of 3,4-diaminophenylurethane, 2.00 g of 4,4′-diaminodiphenyl ether, 30 cc of N-methyl-2-pyrrolidone and 30 cc of N,N-dimethylacetamide. The contents in the flask were stirred and dissolved. The flask was then cooled in an ice bath. To the contents in the flask was slowly added 4.36 g of pyromellitic acid dianhydride. After the addition was completed, the mixture was subjected to reaction at 10°C for 8 hours. The formed polyamic acid urethane had a reduced viscosity, $\eta_{sp/c}$, of 1.20 dl/g. Further, said solution was stable at room temperature without gelling even after six months. Subsequently, a film was made from the polyamic acid urethane solution, and subjected to heat treatment at a temperature of 250° to 400°C under reduced pressure to ring-close and convert the same into a polyimido-imidazopyrrolone film. The weight of the resulting film did not decrease below 450°C when the film was heated in air.

EXAMPLE 21

In the same flask as in Example 1 were placed 2.87 g of 4-p-aminophenoxy-2-aminophenylurethane, 4.32 g of 4,4′-di(m-aminophenoxy)diphenylsulfone, 30 cc of N-methyl-2-pyrrolidone and 30 cc of N,N-dimethylacetamide. The contents in the flask were stirred and the flask was then cooled by ice. To the contents in the flask were slowly added 2.18 g of pyromellitic acid dianhydride and 3.22 g of 3,3′,4,4′-benzophenonetetracarboxylic acid dianhydride. After the addition was completed, the mixture was allowed to react at 10°C for 8 hours. The formed polyamic acid urethane had a reduced viscosity, $\eta_{sp/c}$, of 1.36 dl/g. Further, said solution was stable at room temperature without gelling even after 2 years. Subsequently, a film was made from the polyamic acid urethane solution and heated at 250° to 400°C under reduced pressure to ring-close and convert the same into a polyimido-imidazopyrrolone film. The weight of the film did not decrease below 460°C when the film was heated in air.

EXAMPLE 22

In the same flask as in Example 1 were placed 1.95 g of 2,4-diaminophenylurethane, 2.48 g of 3,3′-diaminodiphenylsulfone, and 60 cc of N,N-dimethylacetamide. The contents in the flask were stirred and the flask was then cooled by ice. To the contents in the flask was slowly added 6.44 g of 3,3′,4,4′-benzophenonetetracarboxylic acid dianhydride. After the addition was completed, the mixture was allowed to react at 10°C for 7 hours. The formed polyamic acid urethane had a reduced viscosity, $\eta_{sp/c}$, of 0.81 dl/g. Then a film was made from the polyamic acid urethane and subjected to heat treatment at 250° to 400°C under reduced pressure to ring-close and convert the same into a polyimido-imidazopyrrolone film. The weight of the film did not decrease below 430°C when the film was heated in air.

EXAMPLE 23

In the same four-necked flask as in Example 1 were placed 1.95 g of 2,4-diaminophenylurethane, 4.32 g of 4,4'-di(m-aminophenoxy)diphenylsulfone, 30 cc of N-methylpyrrolidone, and 30 cc of N,N-dimethylacetamide. The contents in the flask were well stirred and dissolved. The flask was then cooled in an ice bath. To the contents in the flask was slowly added 6.38 g of 2,5-dicarbomethoxyterephthalic acid chloride. After the addition was completed, the mixture was allowed to react at 10°C for three hours. The formed polyamide ester urethane had a reduced viscosity, $\eta_{sp/c}$, of 1.03 dl/g. Further, a solution of said polyamide ester urethane was stable at room temperature without gelling even after one year. Subsequently a film was made from said polyamide ester urethane and subjected to heat treatment at 250° to 400°C under reduced pressure to ring-close and convert the same into a polyimido-imidazopyrrolone film. The weight of the film did not decrease below 450°C when the film was heated in air.

EXAMPLE 24

In the same flask as in Example 1 were placed 1.95 g of 2,4-diaminophenylurethane, 2.00 g of 4,4'-diaminodiphenyl ether, 40 cc of N-methyl-2-pyrrolidone and 20 cc of N,N-dimethylacetamide. The contents in the flask were stirred and the flask was then cooled by ice. To the contents in the flask was slowly added 6.38 g of 4,6-dicarbomethoxyisophthalic acid chloride. After the addition was completed, the mixture was allowed to react at 10°C for 2 hours. The formed polyamide ester urethane had a reduced viscosity, $\eta_{sp/c}$, of 1.03 dl/g. Further, a solution of said polyamide ester urethane was stable at room temperature without gelling even after one year. Subsequently a film was made from the polyamide ester urethane and subjected to heat treatment at 250° to 400°C under reduced pressure to ring-close and convert the same into a polyimido-imidazopyrrolone film. The weight of the film did not decrease below 450°C when the film was heated in air.

EXAMPLE 25

In the same flask as in Example 1 were placed 2.87 g of 4-p-aminophenoxy-2-aminophenylurethane, 1.08 g og m-phenylenediamine, 30 cc of N-methyl-2-pyrrolidone and 30 cc of N,N-dimethylacetamide. The contents in the flask were stirred and the flask was then cooled by ice. To the contents in the flask was slowly added 6.38 g of 2,5-dicarbomethoxyterephthalic acid chloride. After the addition was completed, the mixture was allowed to react at 10°C for three hours. The formed polyamide ester urethane had a reduced viscosity, $\eta_{sp/c}$, of 0.86 dl/g. Further a solution of said polyamide ester urethane was stable at room temperature without gelling even after three months. Subsequently, a film was made from the polyamide ester urethane solution, and subjected to heat treatment at 250° to 400°C under reduced pressure to ring-close and convert the same into a polyimido-imidazopyrrolone film. The weight of the film did not decrease below 430°C when the film was heated in air.

EXAMPLE 26

In the same flask as in Example 1 were placed 3.74 g of 3,3'-diamino-4,4'-diethoxycarbonylaminodiphenyl ether, 1.95 g of 2,4-diaminophenylurethane, 30 cc of N-methyl-2-pyrrolidone and 30 cc of N,N-dimethylacetamide. The contents in the flask were stirred and the flask was then cooled in an ice bath. To the contents in the flask was slowly added 4.36 g of pyromellitic acid dianhydride. After the addition was completed, the mixture was allowed to react at 10°C for five hours. The formed polyamic acid urethane had a reduced viscosity, $\eta_{sp/c}$, of 1.26 dl/g. Further, a solution of said polyamic acid urethane was stable at room temperature without gelling even after one year. Subsequently, a film was made from the polyamic acid urethane solution and subjected to heat treatment at 250° to 400°C under reduced pressure to ring-close and convert the same into a polyimido-imidazopyrrolone film. The weight of the film did not decrease below 450°C when the film was heated in air.

EXAMPLE 27

In the same flask as in Example 1 were placed 1.87 g of 3,3'-diamino-4,4'-diethoxycarbonylaminodiphenyl ether, 0.975 g of 2,4-diaminophenylurethane, 4.32 g of 4,4'-di(m-aminophenoxy(diphenylsulfone, 40 cc of N,N-dimethylacetamide and 20 cc of N-methyl-2-pyrrolidone. The flask was then kept cool in an ice bath and the contents in the flask were dissolved with stirring. To the contents in the flask was slowly added 6.44 g of 3,3',4,4'-benzophenonetetracarboxylic acid dianhydride. After the addition was completed, the mixture was allowed to react at 10°C for 7 hours. The formed polyamic acid urethane had a reduced viscosity, $\eta_{sp/c}$, of 0.88 dl/g. Further a solution of said polyamic acid urethane was stable at room temperature without gelling even after one year. Subsequently a film was made from the polyamic acid urethane solution and subjected to heat treatment at 250° to 400°C under reduced pressure to ring-close and convert the same into a polyimidoimidazopyrrolone film. The weight of the resulting film did not decrease below 480°C when the film was heated in air.

The junction parts of npn type transistor were coated with the above-mentioned solution and the parts were heated at 250°C for three hours. When a DC of 1800 V was applied to said transistor, the leakage current was 1 $\mu$A or less.

The reaction solution was allowed to flow over a glass plate, and films of the intermediate copolymers were formed by evaporating the solvent by heating. Then, the films were heated to 250° to 400°C, whereby films of the desired end copolymers having a thickness of 0.05 mm were obtained, which had the properties shown in Table 1.

Table 1

| | Example 1 | 2 | 4 | 7 | 8 | 10 | 13 | 14 | 15 | 20 | 23 |
|---|---|---|---|---|---|---|---|---|---|---|---|
| Tensile strength (kg/mm$^2$) | 14.3 | 15.2 | 11.8 | 10.6 | 12.5 | 10.4 | 18.7 | 15.5 | 14.1 | 11.3 | 10.1 |
| Elongation at break (%) | 5.0 | 3.0 | 3.1 | 2.5 | 3.5 | 3.1 | 10.5 | 17.7 | 11.6 | 10.4 | 12.5 |
| Elmendorf tear strength (g) | 40.5 | 31.3 | 29.5 | 28.7 | 38.4 | 32.4 | 35.2 | 43.5 | 32.7 | 31.2 | 33.4 |
| Abrasion resis- | | | | | | | | | | | |

Table 1-continued

| | Example 1 | 2 | 4 | 7 | 8 | 10 | 13 | 14 | 15 | 20 | 23 |
|---|---|---|---|---|---|---|---|---|---|---|---|
| tance (amount of abrasion:mg) [Taber type abrasion tester, load 500 g:1000 reciprocations] | 5.1 | 6.7 | 6.8 | 7.1 | 5.8 | 6.5 | 6.9 | 5.7 | 6.3 | 6.4 | 5.9 |
| Acid Resistance $H_2SO_4$, S.G. 1.2* | No change | " | " | " | " | " | " | " | " | " | " |
| Alkali resistance NaOH 10 %* | No change | " | " | " | " | " | " | " | " | " | " |
| Breakdown Voltage (KV) | 11.0 | 12.8 | 10.4 | 11.5 | 9.7 | 8.4 | 11.4 | 10.2 | 9.4 | 10.6 | 9.1 |
| Dielectric tangent (23°C) | 0.016 | 0.013 | 0.014 | 0.020 | 0.008 | 0.012 | 0.004 | 0.005 | 0.018 | 0.009 | 0.018 |
| Dielectric constant (23°C) | 3.2 | 3.5 | 3.4 | 3.8 | 3.4 | 3.6 | 3.2 | 3.3 | 3.7 | 3.2 | 3.8 |

*Room temperature, 24 hrs.

The various properties of the insulated electric wires obtained by coating a conductor with the varnish obtained according to Examples 1, 2, 8, 13, 14 or 16 and baking it at 200° to 350°C are summarized in Table 2.

Table 2

| | Example 1 | 2 | 8 | 13 | 14 | 16 |
|---|---|---|---|---|---|---|
| Conductor diameter (mm) | 1.000 | 1.000 | 1.000 | 1.000 | 1.000 | 1.000 |
| Film thickness (mm) | 0.040 | 0.039 | 0.040 | 0.038 | 0.040 | 0.040 |
| Pinholes (number/5 m) | 0 | 0 | 0 | 0 | 0 | 0 |
| Flexibility { Normal state | Good | Good | Good | Good | Good | Good |
| 250°C, 24 hrs. after aging | Good | Good | Good | Good | Good | Good |
| Cut-through temperature (°C) (load : 1 kg) | >400 | >400 | >400 | >400 | >400 | >400 |
| Heat shock (300°C, 1 hr.) | Good | Good | Good | Good | Good | Good |
| Abrasion resistance (frequency) (NEMA repeating type) | >300 | 172 | >300 | 114 | >300 | >300 |
| Pencil hardness | 7H | 5H | 7H | 5H | 7H | 7H |
| Number of twisting till peeling (20 cm) | 65 | 70 | 68 | 84 | 77 | 75 |
| Breakdown Voltage (KV) (pair twisting) { Normal state | 10.3 | 11.0 | 10.4 | 11.3 | 10.1 | 10.8 |
| 300°C, 24 hrs. after aging | 10.5 | 10.3 | 10.2 | 11.4 | 9.7 | 8.4 |
| Chemical resistance (pencil hardness) (room temperature 24 hrs.) { $H_2SO_4$ | 7H | 5H | 7H | 5H | 7H | 7H |
| (Sp. Gr. 1.2) | 7H | 2H | 7H | H | 7H | 7H |
| NaOH (10 %) | | | | | | |
| Solvent resistance (pencil hardness) (room temperature 24 hrs.) { $C_2H_5OH$ | 7H | 5H | 7H | 5H | 7H | 7H |
| Benzene | 7H | 5H | 7H | 5H | 7H | 7H |

Note:
Flexibility refers to possibility of winding an insulated wire around a wire having the same diameter as that of the insulated wire.

What we claim is:

1. A polymer including groups having the formula:

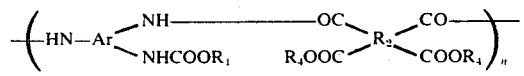

wherein Ar is an aromatic radical; $R_1$ is a monovalent alkyl group having 4 or less carbon atoms, an aryl group having 6 to 12 carbon atoms, a cycloalkyl group having 6 to 12 carbon atoms, and aralkyl group having 7 to 12 carbon atoms or an alkaryl group having 7 to 12 carbon atoms; $R_2$ is a tetravalent radical of a tetracarboxylic acid; $R_4$ is hydrogen or the above-defined $R_3$; and n is a positive integer.

2. The polymer of claim 1, wherein n is sufficiently large so that said polymer is resinous.

3. The polymer of claim 2, further including groups having the following formula:

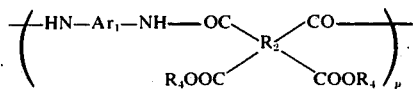

wherein $Ar_1$ is an aromatic radical, and further wherein p is a positive integer.

4. The polymer of claim 3, wherein n:p is within the range of about 5:95 to 95:5.

5. A polymer including groups having the following formula:

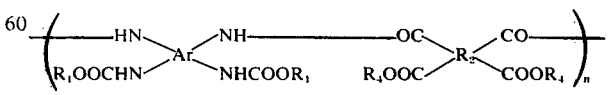

wherein Ar is an aromatic radical; $R_1$ is a monovalent alkyl group having 4 or less carbon atoms, an aryl group having 6 to 12 carbon atoms, a cycloalkyl group having 6 to 12 carbon atoms, and an aralkyl group having 7 to 12 carbon atoms or an alkaryl group having 7 to 12 carbon atoms; $R_2$ is a tetravalent radical of a tetracarboxylic acid; $R_4$ is hydrogen or the above-defined $R_3$; and n is a positive integer.

6. The polymer of claim 5, wherein n is sufficiently large so that said polymer is resinous.

7. The polymer of claim 6, further including groups having the following formula:

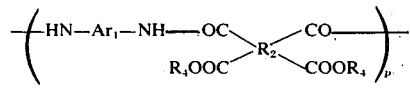

wherein $Ar_1$ is an aromatic radical, and further wherein p is a positive integer.

8. The polymer of claim 7, wherein n:p is within the range of about 5:95 to 95:5.

9. The polymer of claim 7, further including groups having the following formula:

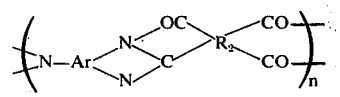

wherein m is a positive integer.

10. A process for making a polymer including groups having the following formula:

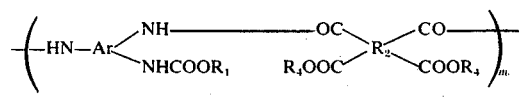

comprising heating at a temperature of about 100°C. or more for sufficient time to effect ring closure a polymer including groups having the following formula:

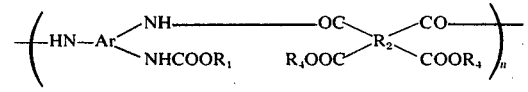

wherein Ar is an aromatic radical; $R_1$ is a monovalent alkyl group having 4 or less carbon atoms, an aryl group having 6 to 12 carbon atoms, a cycloalkyl group having 6 to 12 carbon atoms, and an aralkyl group having 7 to 12 carbon atoms or an alkaryl group having 7 to 12 carbon atoms; $R_2$ is a tetravalent radical of a tetracarboxylic acid; $R_4$ is hydrogen or the above-defined $R_3$; and n is a positive integer.

11. A process for making a polymer including groups having the following formula:

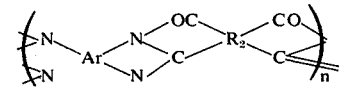

comprising heating at a temperature of about 250°C. to about 400°C. for a sufficient time to effect ring closure a polymer including groups having the following formula:

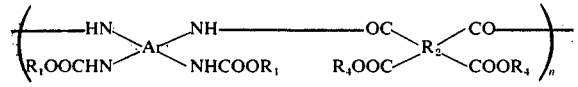

wherein Ar is an aromatic radical; $R_1$ is a monovalent alkyl group having 4 or less carbon atoms, an aryl group having 6 to 12 carbon atoms, a cycloalkyl group having 6 to 12 carbon atoms, and an aralky group having 7 to 12 carbon atoms or an alkaryl group having 7 to 12 carbon atoms; $R_2$ is a tetravalent radical of a tetracarboxylic acid derivative residue; $R_4$ is hydrogen or the above-defined $R_3$; and n is a positive integer.

12. The polymer of claim 1 wherein Ar is a trivalent radical obtained bay removing the two amino groups and the monoalkoxycarbonylamino group from at least one aromatic diaminopmonoalkoxycarbonyl amino compound selected from the group consisting of 2,4-diaminophenylurethane, 2,4-diamino-6-methylphenylurethane, 2,6-diamino-3-methylphenylurethane, 2,4-diamino-3-methylphenylurethane, 2,4-diamino-5-methylphenylurethane, 2,6-diamino-4-methylphenylurethane, 2,4-diamino-1-naphthylurethane, 1,6-diamino-2-naphthylurethane, 4,4'-diamino-3-ethoxycarbonylaminodiphenyl ether, 5-(m-aminophenoxy)-2-aminophenylurethane and 4-(p-aminophenyl)-2-aminophenylurethane.

13. The polymer of claim 1, wherein Ar is a tetravalent radical obtained by removing the two amino groups and the two alkoxy carbonylamino groups from at least one aromatic diaminodialkoxycarbonylamino compound selected from the group consisting of 3,3'-diamino-4,4'-diethoxycarbonyl-aminodiphenyl ether, 3,3'-diamino-4,4'-diethoxycarbonylaminodiphenylmethane, 3,3'-diamino-4,4'-diethoxycarbonylaminophenyl, 3,3'-diamino-4,4'-diethoxycarbonylaminodiphenylsulfone, 3,3'-diamino-4,4'-diethoxycarbonylaminodiphenylsulfide, 1,5-diamino-2,4-diethoxycarbonylaminobenzene and 1,4-diamino12,5-diethoxycarbonylaminobenzene.

14. The poylymer of claim 1, wherein said tetracarboxylic acid dianhydride or tetracarboxylic acid diester dihalide is at least one compound selected from the group consisting of pyromellitic acid dianhydride, 3,3',4,4'-diphenyltetracarboxylic dianhydride, cyclopentanetetracarboxylic dianhydride, 3,3',4,4'-benzophenone tetracarboxylic acid dianhydride, 1,2,5,6-naphthalene tetracarboxylic acid dianhydride, 2,3,6,7-naphthalene tetracarboxylic acid dianhydride, 2,3,5,6-pyridine tetracarboxylic acid dianhydride, 1,4,5,8-naphthalene tetracarboxylic acid dianhydride, 4,4'-sulfonyldiphthalic acid anhydride and tetracarboxylic diester halides.

15. The polymer of claim 7, wherein $Ar_1$ is a divalent radical obtained by removing the amino groups from at least one compound selected from the group consisting of 4,4'-diaminodiphenyl ether, 4,4'-diaminodiphenylmethane, 4,4'-diaminodiphenylpropane, 4,4'-diaminodiphenylsulfone, 4,4'-diaminodiphenylsulfide, 3,3'-diaminodiphenylsulfone, benzidine, metaphenylenediamine, paraphenylenediamine, 1,5-diaminonaphthalene, 2,6-diaminonaphthalene, 4,4'-di(m-aminophenoxy)-diphenylsulfone, 2,6-diaminopyridine, 4,4'-di(p-aminobenzoyl)diphenyl ether, 4,4'-di(p-aminophenoxy)diphenylsulfone, 1,4-di(p-aminophenoxy)benzene and 1,3-di(p-aminophenoxy)benzene.

16. A process for producing a polyamide type polymeric resinous material, which comprises reacting at 100°C. or less (a) an aromatic diaminoalkoxycarbonylamino compound having two amino groups and at least one alkoxycarbonylamino group on the aromatic nucleus with (b) at least one tetracarboxylic acid dianhydride or tetracarboxylic acid diester dihalide, in an inert solvent, in such a proportion that the amount of the (a) amine component in said resinous material is substantially equivalent to the (b) acid component.

17. The process of claim 16, wherein the aromatic diaminoalkoxycarbonylamino compound reacts with the tetracarboxylic acid dianhydride or diester dihalide at an equimolar ratio.

18. A process for producing a polyamide type copolymeric resinous material, which comprises reacting at 100°C. or less (a) an aromatic diaminoalkoxycarbonylamino compound having two amino groups and at least one alkoxycarbonylamino group on the aromatic nucleus with (b) at least one tetracarboxylic acid dianhydride or tetracarboxylic acid diester dihalide and (c) a diamine compound, in an inert solvent, in such a proportion that the total amount of the (a) and (c) amine components in said resinous material is substantially equivalent to the (b) acid component.

19. A process for producing a polymeric resinous material with imidazopyrrolone rings, which comprises reacting at 100°C. or less (a) an aromatic diaminoalkoxycarbonylamino compound having two amino groups and at least one alkoxycarbonylamino group on the aromatic nucleus with (b) at least one tetracarboxylic acid dianhydride or a tetracarboxylic acid diester dihalide in an inert solvent to prepae a polyamide type polymeric resinous material in which the amount of amine component (a) is substantially equivalent to the (b) acid component, and ring-closing the resulting polyamide type copolymeric resinous material by heating at 100°C. or above.

20. A process for producing a copolymeric resinous material with imido-imidazopyrrolone rings, which comprises reacting at 100°C. or less (a) an aromatic diaminoalkoxycarbonylamino compound having two amino groups and at least one alkoxycarbonylamino group on the aromatic nucleus with (b) at least one tetracarboxylic acid dianhydride or tetracarboxylic acid diester dihalide and (c) a diamine compound in an inert solvent to prepare a polyamide type copolymeric resinous material in which the total amount of the amine components (a) and (c) is substantially equivalent to the amount of acid (b) and further in which the ratio of the aromatic diaminoalkoxycarbonylamino compound (a) to the amount of diamine compound (c) is 95:5 to 5:95, and ring-closing the resulting polyamide type copolymeric resinous material by heating to 100°C. or more.

21. The process as claimed in claim 16, wherein the inert solvent is N-methyl-2-pyrrolidone, N,N-dimethylacetamide, N,N-dimethylformamide, N,N-diethylformamide, hexamethylphosphoramide, pyridine, triethylamide, N,N-dimethylaniline, quinoline, isoquinoline or N-ethylmorpholine.

22. The process as claimed in claim 16, wherein the reaction is effected at a temperature ranging from about room temperature to about 100°C.

23. The process as claimed in claim 18, wherein the ring-closing reaction is effected by heating the polyamide type copolymeric resinous material at a temperature of about 250° to about 400°C.

24. A process for making a polyamide type polymeric resinous material comprising reacting at a temperature of about 100°C. or less (a) an aromatic diaminoalkoxycarbonylamino compound in which the amino group and the alkoxycarbonylamino group are bonded to adjacent carbon atoms, and (b) a tetracarboxylic acid dianhydride or a tetracarboxylic acid diester dihalide in which the ester group and the acid halide group are bonded to adjacent carbon atoms, in such a proportion that the amount of the (a) amine component in said polymeric resinous material is substantially equivalent to the (b) acid component.

25. The process of claim 24, wherein the aromatic diaminoalkoxycarbonylamino compound is at least one aromatic diaminomonoalkoxycarbonyl amino compound selected from the group consisting of 2,4-diaminophenylurethane, 2,4-diamino-6-methylphenylurethane, 2,6-diamino-3-methylphenylurethane, 2,4-diamino-3-methylphenylurethane, 2,4-diamino-5-methylphenylurethane, 2,6-diamino-4-methylphenylurethane, 2,4-diamino-1-naphthylurethane, 1,6-diamino-2-naphthylurethane, 4,4'-diamino-3-ethoxycarbonylaminodiphenyl ether, 5-(m-aminophenoxy)-2-aminophenylurethane and 4-(p-aminophenyl)-2-aminophenylurethane.

26. The process of claim 24, wherein the aromatic diaminoalkoxycarbonylamino compound is at least one aromatic diaminodialkoxycarbonylamino compound selected from the group consisting of 3,3'-diamino-4,4'-diethoxycarbonylaminodiphenyl ehter, 3,3'-diamino-4,4'-diethoxycarbonylaminodiphenylmethane, 3,3'-diamino-4,4'-diethoxycarbonylaminophenyl, 3,3'-diamino-4,4'-diethoxycarbonylaminodiphenylsufone, 3,3'-diamino-4,4'-diethoxycarbonylaminodiphenylsulfide, 1,5-diamino-2,4-diethoxycarbonylaminobenzene and 1,4-diamino-2,5-diethoxycarbonylaminobenzene.

27. The process of claim 24, wherein the tetracarboxylic acid derivative is at least one compound selected from the group consisting of pyromellitic acid dianhydride, 3,3',4,4'-diphenyltetracarboxylic dianhydride, cyclopentanetetracarboxylic dianhydride, 3,3',4,4'-benzophenone tetracarboxylic acid dianhydride, 1,2,5,6-naphthalene tetracarboxylic acid dianhydride, 2,3,6,7-naphthalene tetracarboxylic acid dianhydride, 2,3,5,6-pyridine tetracarboxylic acid dianhydride, 1,4,5,8-naphthalene tetracarboxylic acid dianhydride, 4,4'-sulfonyldiphthalic acid anhydride and tetracarboxylic diester halides.

28. A process for making a polyamide type copolymeric resinous material comprising reacting at a temperature of about 100°C. or less (a) an aromatic diaminoalkoxycarbonylamino compound having two amino groups and at least one alkoxycarbonylamino group on the aromatic ring in which the amino group and the alkoxycarbonylamino group are bonded to adjacent carbon atoms, (b) a tetracarboxylic acid dianhydride or a tetracarboxylic acid diester dihalide in which the ester group and the acid halide group are bonded to adjacent carbon atoms, and (c) a diamine in such a proportion that the total amount of the (a) and (c) amine components in said copolymeric resinous material is substantially equivalent to the (b) acid component.

29. The process of claim 22, wherein the amount of diamine compound in said resinous material is about 5 to 95 mole percent and further wherein the amount of said aromatic diaminoalkoxycarbonylamino compound in said resinous material is about 5 to 95 mole percent, the percents being based on the sum of the amino compounds in said resinous material.

30. The process of claim 29, wherein the diamine compound is at least one member selected from the group consisting of 4,4'-diaminodiphenyl ether, 4,4'-diaminodiphenylmethane, 4,4'-diaminodiphenylpropane, 4,4'-diaminodiphenylsulfone, 4,4'-diaminodiphenylsulfide, 3,3'-diaminodiphenylsulfone, benzidine, metaphenylenediamine, paraphenylenediamine, 1,5-diaminonaphthalene, 2,6-diaminonaphthalene, 4,4'-di(m-aminophenoxy) diphenylsulfone, 2,6-diaminopyridine, 4,4'-di(p-aminobenzoyl)diphenyl ether, 4,4'-di)p-aminophenoxy)diphenylsulfone, 1,4-di(p-aminophenoxy) benzene and 1,3-di(p-aminophenoxy)-benzene.

31. The process of claim 30, wherein said aromatic diaminoalkoxycarbonylamino compound is at least one member selected from the group consisting of 2,4-diaminophenylurethane, 2,4-diamino-6-methylphenylurethane, 2,6-diamino-3-methylphenylurethane, 2,4-diamino-3-methylphenylurethane, 2,4-diamino-5-methylphenylurethane, 2,6-diamino-4-methylphenylurethane, 2,4-diamino-1-naphthylurethane, 1,6-diamino-2-naphthylurethane, 4,4'-diamino-3-ethoxycarbonylaminodiphenyl ether, 5-(m-aminophenoxy)-2-aminophenylurethane, 4-(p-aminophenyl)2-aminophenylurethane, 3,3'-diamino-4,4'-diethoxycarbonylaminodiphenyl ether, 3,3'-diamino-4,4'-diethoxycarbonylaminodiphenylmethane, 3,3'-diamino-4,4'-diethoxycarbonylaminodiphenylmethane, 3,3'-diamino-4,4'-diethoxycarbonylaminophenyl, 3,3'-diamino-4,4'-diethoxycarbonylaminodiphenylsulfone, 3,3'-diamino-4,4'-diethoxycarbonylaminodiphenylsulfide, 1,5-diamino-2,4-diethoxycarbonylaminobenzene, 1,4-diamino-2,5-diethoxycarbonylaminobenzene, and further wherein said tetracarboxylic acid dianhydride or tetracarboxylic acid diester dihalide is selected from the group consisting of pyromellitic acid dianhydride, 3,3',4,4'-diphenyltetracarboxylic dianhydride, cyclopentanetetracarboxylic dianhydride, 3,3',4,4'-benzophenone tetracarboxylic acid dianhydride, 1,2,5,6-naphthalene tetracarboxylic acid dianhydride, 2,3,6,7naphthalene tetracarboxylic acid dianhydride, 2,3,5,6-pyridine tetracarboxylic acid dianhydride, 1,4,5,8-naphthalene tetracarboxylic acid dianhydride, 4,4'-sulfonyldiphthalic acid anhydride and tetracarboxylic diester halides.

32. The process of claim 18, wherein said resinous material includes pendant alkoxycarbonylamino groups attached to aromatic nuclei.

33. The process of claim 27, wherein said tetracarboxylic acid derivatives have carbonyl groups capable of reacting to form amide linkages with the nitrogen atoms in said aromatic diaminoalkoxycarbonylamino compound.

34. The process of claim 22, wherein said resinous material includes pendant alkoxycarbonylamino groups attached to aromatic nuclei.

35. The process of claim 29, wherein said tetracarboxylic acid derivatives have carbonyl groups capable of reacting to form amide linkages with the nitrogen atoms in said aromatic diaminoalkoxycarbonylamino compound.

36. The process of claim 16, wherein said polyamide type polymeric resinous material is obtained by reacting at a temperature of about room temperature to about 100°C. (a) an aromatic diaminoalkoxycarbonylamino compound in which the amino group and the alkoxycarbonylamino group are bonded to adjacent carbon atoms, and (b) a tetracarboxylic acid dianhydride or a tetracarboxylic acid diester dihalide in which the ester group and the acid halide group are bonded to adjacent carbon atoms, in such a proportion that the ratio of the (a) amine component in said polymeric resinous material is to the (b) acid component is 1:1 to 1:1.03.

37. The process of claim 18, wherein said polyamide type copolymeric resinous material is obtained by reacting at a temperature of from about room temperature to about 100°C. (a) an aromatic diaminoalkoxycarbonylamino compound having two amino groups and at least one alkoxycarbonylamino group on the aromatic ring in which the amino group and the alkoxycarbonylamino group are bonded to adjacent carbon atoms, (b) a tetracarboxylic acid dianhydride or a tetracarboxylic acid diester dihalide in which the ester group and the acid halide group are bonded to adjacent carbon atoms, and (c) a diamine in such a proportion that the ratio of the total amount of the (a) and (c) amine components in said copolymeric resinous material to the (b) acid component is 1:1 to 1:1.03.

38. The process of claim 19, wherein said polyamide type polymeric resin material is produced by reacting at a temperature of about room temperature to about 100°C. (a) an aromatic diaminoalkoxycarbonylamino compound in which the amino group and the alkoxycarbonylamino group are bonded to adjacent carbon atoms, and (b) a tetracarboxylic acid dianhydride or a tetracarboxylic acid diester dihalide in which the ester group and the acid halide group are bonded to adjacent carbon atoms, in such a proportion that the ratio of the (a) amine component in said polymeric resinous material to the (b) acid component is 1:1 to 1:1.03.

39. The process of claim 38, wherein ring closing of said polyamide type polymeric resinous material is accomplished by heating at a temperature of about 250°C. to about 400°C.

40. The process of claim 20, wherein said polyamide type copolymeric resinous material is formed by reacting at a temperature of from about room temperature to about 100°C. (a) an aromatic diaminoalkoxycarbonylamino compound having two amino groups and at least one alkoxycarbonylamino group on the aromatic ring in which the amino group and the alkoxycarbonylamino group are bonded to adjacent carbon atoms, (b) a tetracarboxylic acid dianhydride or a tetracarboxylic acid diester dihalide in which the ester group and the acid halide group are bonded to adjacent carbon atoms, and (c) a diamine in such a proportion that the ratio of the total amount of the (a) and (c) amine components in said copolymeric resinous material to the (b) acid component is 1:1 to 1:1.03.

41. The process of claim 40, wherein ring closing of said polyamide type copolymeric resinous material is accomplished by heating to a temperature of about 250° to 400°C.

42. The process of claim 19, wherein the reaction is effected at a temperature ranging from about room temperature to about 100°C.

43. The process of claim 20, wherein the ring-closing reaction is effected by heating the polyamide type copolymeric resinous material at a temperature of about 250° to about 400°C.

* * * * *